United States Patent [19]

Åslund et al.

[11] 3,809,482

[45] May 7, 1974

[54] SIGNAL-COMPENSATING SYSTEM FOR MEASURING MACHINES, IN WHICH PHOTOGRAPHIC PLATES ARE EXAMINED BY A PHOTO-ELECTRIC METHOD

[75] Inventors: Nils Robert Dahr Åslund, Johanneshov; Sven-Olof Pettersson; Sten Börje Angelstrand, both of Jonkoping, all of Sweden

[73] Assignee: Saab-Scania Aktiebolag, Linkoping, Sweden

[22] Filed: Apr. 3, 1973

[21] Appl. No.: 347,417

[30] Foreign Application Priority Data
Apr. 5, 1972 Sweden.............................. 4335/72

[52] U.S. Cl. ................................ 356/205, 356/205
[51] Int. Cl. ...................... G01n 21/06, G01n 21/22
[58] Field of Search .......... 356/202, 203, 204, 205, 356/206, 95, 96

[56] References Cited
UNITED STATES PATENTS
3,522,739  8/1970  Coor et al. ............................ 356/97
3,751,171  8/1973  Hughes, Jr. et al. ................ 356/203

*Primary Examiner*—Ronald L. Wibert
*Assistant Examiner*—V. P. McGraw

[57] ABSTRACT

An image beam from a constant intensity light source is passed through a small area of an image on a photographic plate, thence through a variable width scanning slot and onto a photoelectric detector. Relative scanning motion between beam and slot is effected in directions transverse to slot length. A second beam from the same source is directed around the plate, through the slot and onto the detector. The beams fall on the detector alternately, in synchronism with scanning, so that the second beam produces calibration pulses. Detector output is so amplified as to maintain amplified calibration pulses at constant magnitude.

5 Claims, 1 Drawing Figure

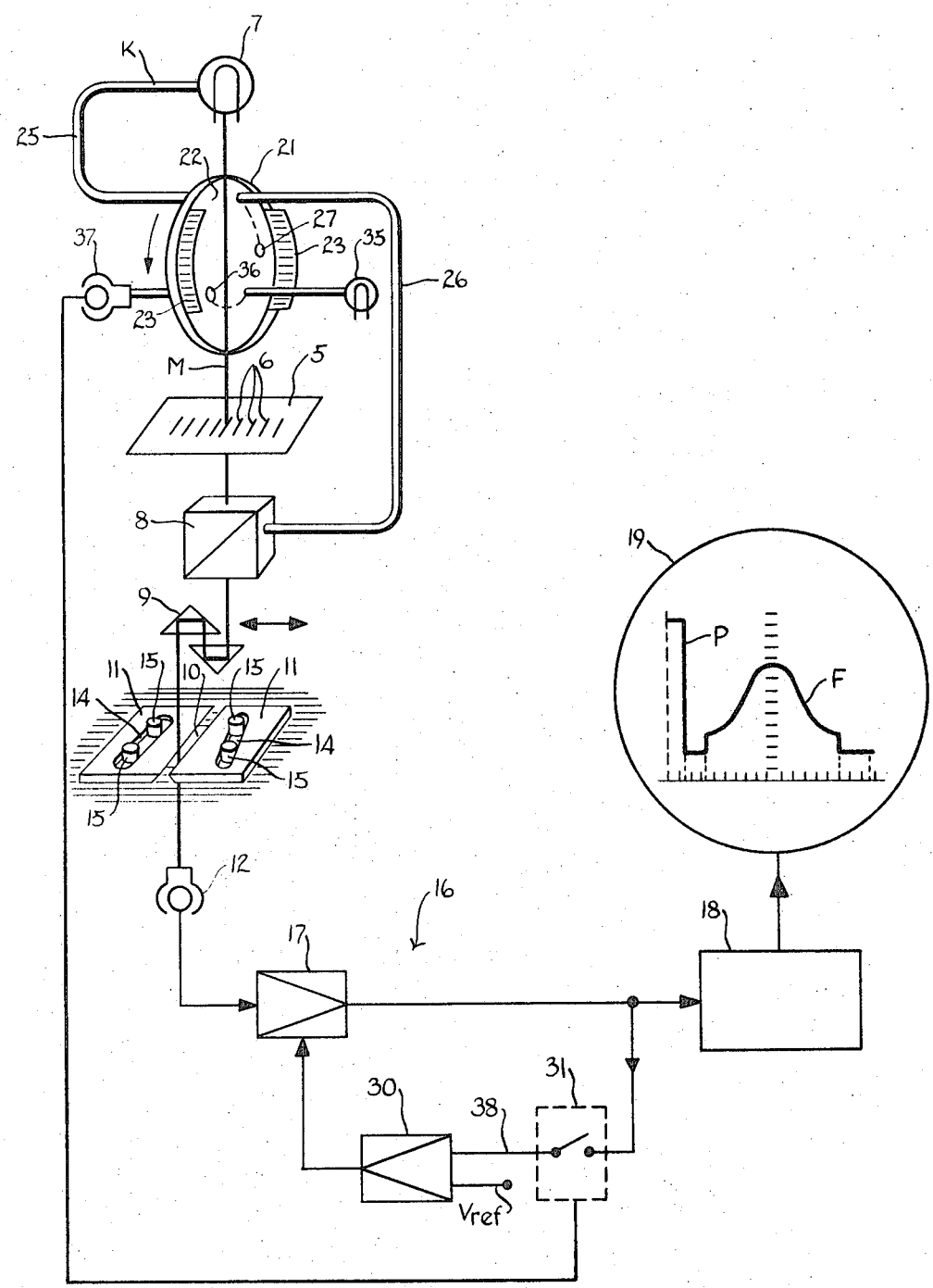

SIGNAL-COMPENSATING SYSTEM FOR MEASURING MACHINES, IN WHICH PHOTOGRAPHIC PLATES ARE EXAMINED BY A PHOTO-ELECTRIC METHOD

This invention relates to a method and apparatus for evaluating variations in density (blackness) across a small area of an image on a photographic plate by scanning across such an area to produce density output signals that vary in magnitude in correspondence with detected variations in density; and the invention is more particularly concerned with a method and means in such apparatus for producing calibration pulse signals which alternate with density output signals and which have a magnitude corresponding to a predetermined level of density, so that the density output signals can be directly compared to such calibration signals for purposes of the evaluation.

Apparatus of the type to which the present invention relates can be used, for example, in spectrophotography, wherein the light emanating from a source being studied is resolved into a rainbow-like spectrum band by means of a prism, and the spectrum band is photographed on black-and-white film. The variations in density along the image of the spectral band on the film are of significance because they establish the presence and the intensity of light of certain wavelengths and/or the absence of light of other wavelengths. The same technique can be used for other investigations wherein variations in image density across a small area of a photographic plate are of significance.

Obviously any such study poses stringent demands for accuracy and requires that the measuring machine used for evaluation of image density on the photographic plate shall be so designed as to avoid, insofar as possible, faults in the optical and mechanical parts of the machine and in its electronic system. However, certain sources of possible error have heretofore been inherent in such machines, as will be apparent from a brief consideration of the general nature of such apparatus.

In such a machine, light from a constant intensity light source is collected into a narrow beam that is directed through a small area of the plate that is to be subjected to study, and thence through a narrow scanning slot and onto a photoelectric detector. The light beam is so focused that the means which defines the scanning slot is at the imaging plane. The image area traversed by the beam is scanned by effecting motion of the scanning slot defining means relative to the beam, in directions transverse to the slot length. The output of the photoelectric detector is an electrical signal that varies in magnitude in correspondence with variations in film density detected during the scan. This output, properly amplified and otherwise processed, can be impressed upon an oscilloscope to achieve a presentation which depicts, in graph-like form, the variations in density across the scanned area.

However, apart from the variables that are involved in processing the output of the detector to present it as a display on the oscilloscope screen, the machine involves several variables which can materially affect output signal magnitudes. Thus, for example, with time and use there may be a slow change in the intensity or the spectral composition of the light emanating from the light source, or there may be a change in the sensitivity of the detector as a result of aging or ambient conditions such as temperature. These factors are difficult to detect.

A variable which poses a particularly complicated problem is width of the scanning slot. It is necessary that the slot width be made adjustable to accommodate various possible characteristics of the image area being studied. Thus where a significant portion of an image being studied is of small extent, or where there are significant variations in density across a small distance in a scanning direction, the image must be scanned with a narrow slot inasmuch as such small and significant density variations could not be detected in scanning with a wide slot. On the other hand, where a portion of an image area to be studied has weak contrast in relation to its surrounding area on the photographic plate, a relatively wide scanning slot aperture will be used to achieve a relatively high signal-to-noise ratio (variations in density that are not of significance being regarded as noise).

Since the character of an image area to be studied cannot be predicted, and often varies from one significant part of a photographic plate to another, provision must be made for adjustably varying the width of the scanning slot. However, any change in slot width tends to have an effect upon what can be considered the scale of the output signal. Thus, all other things being equal, if the slot width is narrowed, the top of the intensity distribution presentation may be reduced in height; whereas increasing the slot width raises the peak of the intensity distribution curve on the oscilloscope screen while at the same time producing an increasing distortion of the density distribution profile. The reduction in height of the profile due to narrowing of the slot could be compensated for by raising the gain of signal amplification, but this also results in a correspondingly increased amplification of noise. The increased distortion of the density distribution profile that occurred with increased slot width has heretofore been difficult to distinguish from the broadening of the profile that occurred with upscaling of the entire presentation.

Thus it has heretofore been necessary for an operator of such a machine to adjust slot width to the character of the image area being studied, adjust amplifier gain to make an approximate compensation for the adjustment in slot width, and then, on the basis of skill and experience, make a more or less educated guess at the combined effects which such adjustments will have upon the presentation of scanning information. In the end, therefore, the presentation was not necessarily an accurate depiction of density values but was merely a first approximation to which the operator applied his knowledge of the effects of the interdependent adjustments that had been made in order to get a more refined and presumably better approximation.

The prior method was of course time consuming as well as inaccurate, since it was often necessary to make several adjustments in order to get enough information about the effects of such adjustments upon one another and the presentation to serve as a guide for evaluating the presentation. But a more serious objection was that it was not possible, with prior apparatus, to apply any standard of quantitative measurement directly to the presentation, owing to the manner in which the scale of the presentation was affected by the interdependent adjustments that had to be made to slot width and amplifier gain.

By contrast it is an object of this invention to provide in a machine of the character described means for producing a reference pulse signal of a predetermined magnitude that can be used as a calibration scale for comparison with the output signal that signifies detected density variations, and which pulse signal can be used to produce a barlike presentation on an oscilloscope screen that appears alongside the density profile presentation and can be directly compared with the density profile so that it can serve as a scale for measuring density values.

More specifically, it is an object of this invention to provide a method and means in a machine of the character described for producing density calibration pulses of a magnitude that corresponds to a predetermined density, the magnitude of each said pulse being independent of the width of the scanning slot; and, further, to provide a method and means whereby such calibration pulses can be employed to so control amplifier gain factor as to compensate for variations in scanning slot width.

It is also an object of this invention to provide a method and means in a machine of the character described whereby automatic compensation is made for small variations in intensity or spectral content of the light used for scanning and/or in the sensitivity of the photoelectric detector.

With these observations and objectives in mind, the manner in which the invention achieves its purpose will be appreciated from the following description and the accompanying drawing, which exemplify the invention, it being understood that changes may be made in the specific apparatus disclosed herein without departing from the essentials of the invention set forth in the appended claims.

The accompanying drawing illustrates one complete example of an embodiment of the invention constructed according to the best mode so far devised for the practical application of the principles thereof, and in which:

The single FIGURE is a more or less diagrammatic view of a machine that embodies the principles of the present invention.

Referring now to the accompanying drawing, the numeral 5 designates a photographic plate that is shown, for purposes of example, as bearing an image of a light spectrum which is typically in the shape of an elongated band having transverse bars 6 of different densities (blackness), the various bars of course denoting light (or the absence of light) of various wavelengths in the photographed spectrum. At each bar 6 the emulsion density varies in a known manner with the intensity and wavelength (color) of the light, and the position of a bar along the length of the band corresponds in a known manner to the wavelength of light that it denotes. Hence analysis of the spectral image, in terms of its density at different positions along the spectral band or its density variation across narrow zones transverse to that band, can provide valuable information about the source of the light that produced the photographed spectrum.

For the purpose of scanning a localized area of the photographed plate in order to obtain such density information, light from a light source 7 that is energized by constant voltage d.c. is collected into a narrow image beam M and projected through the small area of the plate 5 that is the subject of study, and thence, in succession, through reflecting means 8, movable prism means 9, a scanning slot 10 that is defined by a pair of edgewise adjustable opaque plates 11, and onto a photoelectric cell 12. The image beam M is collected and focused by suitable lens means, comprising condensor and focusing lenses, but since these expedients are readily understood to be present, and are in themselves well known, they are omitted from the FIGURE for the sake of simplicity.

It should be mentioned, however, that such lens means serve to bring the image to a focus at an imaging plane which coincides with the surfaces of the opaque plates 11 that define the scanning slot 10.

Scanning could be accomplished by effecting edgewise movement, in unison, of the opaque plates 11 in directions transverse to the scanning slot 10 which they define; but in this case it is preferred to move the image beam M relative to the scanning slot. To that end the prism means 9 is mounted and driven for reciprocatory motion in directions transverse to the slot length. The portion of the image beam M that passes through the scanning slot and falls upon the photoelectric detector 12 thus varies in intensity during the course of a scan, in correspondence with variations in density across the scanned zone, and the density signal output from the detector 12 will have a corresponding variation.

The opaque plates 11 are edgewise adjustable toward and from one another to provide for adjusting variations in the width of the scanning slot. They are shown as being provided, for that purpose, with tracks or slots 14 which extend obliquely to the scanning slot in a wedgelike formation and which cooperate with fixed guide studs 15. Such adjusting variation of the width of the scanning slot will of course affect the magnitude of the density output signals from the detector 12, since more light falls upon the detector as the slot is widened.

The output of the detector 12 is fed to electronic equipment which is designated generally by 16 and which comprises an amplifier 17 that is described hereinafter and a signal processing unit 18 which imparts to the amplified signals from the amplifier a suitable shape for numeric presentation in storage means from which data concerning investigated objects can be read for postprocessing and evaluation. The signal can also be given a shape suitable for photographic presentation on the screen 19 of an oscilloscope to which the signal processing unit has an input connection.

At this point it should be mentioned that scanning of an image area must often take place in mutually perpendicular directions, and to provide for such coordinate scanning the reflector means 8 can divide the image beam M into a pair of counterpart beams, each of which has its own scanning system comprising a reciprocatory prism, a scanning slot and a detector. One arrangement for effecting such coordinate scanning is disclosed in the companion application of N.R.D. Aslund, Ser. No. 344,644, filed Mar. 26, 1973, which has the same assignee as this application. As the description proceeds it will be evident that the present invention is readily applicable to such two-dimensional scanning apparatus, without any need to modify its principles as hereinafter described. The manner of applying this invention to such two-dimensional scanning is generally indicated in that application.

To provide for calibration pulses in accordance with the principles of this invention, light from the constant intensity source 7 is collected into a calibration flux K and is guided by fibre optics 25, 26 along a second path which is in bypassing relation to the photographic plate 5 and by which it is brought to the reflector means 8, whence it follows a path which coincides with that of the image beam M. Light that has followed this second path strikes the detector 12 alternately with the light of the image beam, and such alternation is synchronized with scanning.

For effecting such alternation there is a chopper or light interrupting means 21 at a location in the image beam path which is between the light source and the photographic plate. The chopper comprises a disc 22, mounted alongside the path of the image beam M with its axis transverse to that beam, and opaque circumferential wall portions 23 on the disc which extend partially around it and project axially into the path of the image beam. The chopper is constrained to rotate in synchronism with reciprocation of the scanning prism means 9, and as the chopper rotates its curved wall portions 23 alternately break the image beam and permit it to pass between them. The rate of chopper rotation is of course such as will insure that the prism means 9 makes a full stroke or a whole number of reciprocatory strokes during each period that the image beam is permitted to pass to the detector 12.

In the intervals between such periods of scan, the calibration beam K is imposed upon the detector. The fibre optic rod 25 that defines one part of the path of the calibration beam has one end adjacent to the lamp bulb 7 to receive light therefrom and has its other end adjacent to one face of the disc 22 of the chopper. The other fibre optic rod 26 has one end at the opposite face of the chopper disc, in line with the fibre optic 25, and has its other end adjacent to the reflecting means 8. There is a small window or aperture 27 in the chopper disc that comes into register with the two fibre optic rods once during each revolution of the chopper. Such registration, which of course permits light to pass from the rod 25 to the rod 26, occurs at a time when the image beam M is intercepted by the curved walls 23 and preferably during only a middle part of each such interval of image beam interruption.

It will be evident that each of the light pulses produced by registration of the window 27 with the fibre optics 25 and 26 produces a pulse signal in the detector 12, which pulse signal is spaced by a very brief time interval from the preceding and succeeding density output signals. Hence, after processing, the output of the detector appears on the oscilloscope screen 19 at a bar-like pulse signal P appearing alongside of, and slightly spaced from, a presentation of an image density profile F. Furthermore, for reasons which will become apparent as the description proceeds, the bar-like pulse signal P can be used as a measuring scale to which the height of any point on the density profile F can be directly compared for the purpose of obtaining a measurement of density value at that point.

Since the calibration beam K originates from the same light source as the image beam M and is guided to the same detector that scans the image beam, through the same scanning slot, all of the variables that are contributed by these elements can be compensated for by using the calibration pulses to so adjust the gain of the amplifier 17 as to maintain the amplified calibration pulses at a constant magnitude. With amplifier gain so adjusted, the amplified density signals will be in properly scaled relationship to the calibration pulse signals, and therefore density values can be ascertained by direct reference to the processed calibration pulse signals, inasmuch as density is the only variable not compensated for. Such adjustment of the gain of the amplifier 17 could be accomplished manually, by reference to the presentation on the oscilloscope screen 19 and in a manner to maintain the pulse signal presentation P at a predetermined height; but it is obviously preferable to provide for automatic gain control and it is relatively easy to do so.

To this end the amplifier 17 has an input which is connected with the output of a differential amplifier means 30, and the latter is intermittently connected with the output of amplifier 17, in feedback relation thereto, by means of an automatic switching device 31. The automatic switching device is closed only momentarily, and only at a time when a calibration pulse appears on the output of the detector. It will be appreciated that there are various expedients by which closure of the switching device 31 can be synchronized with calibration pulses, but as here shown the synchronizing means comprises a second light source 35 and a second window 36 in the chopper disc through which light from the second bulb 35 is beamed onto a second photoelectric detector 37 that is connected with the switching device 31. The window 36 is at a different radial distance from the center of the disc than the window 27, and of course the window 36 comes into alignment with the bulb 35 and the detector 37 only at the time when closure of the switching device is to be effected, producing a pulse output from the detector 37.

At the moment the switching device is closed by a pulse from the detector 37, the output of the amplifier 17 constitutes the amplified calibration pulse signal, which is fed through the switching device to one input 38 of the differential amplifier means 30. To another input thereof ($V_{ref}$) there is applied a constant voltage reference signal to which the magnitude of the amplified pulse signal is automatically compared. The differential amplifier means also comprises a so-called analog storage which is adapted to store the value of a transient voltage appearing at its input and, during the course of a predetermined interval thereafter, to put out a substantially constant difference signal which corresponds in magnitude and sign to the difference in magnitude between the reference voltage and the amplified calibration pulse signal. This difference signal is fed to the amplifier 17 all through the scanning period next following the calibration pulse, to control the gain factor of the amplifier. And since amplifier gain is thus controlled to maintain the calibration pulse signal at a constant magnitude, and since any instant during scan the scanned image signal differs from the calibration signal only by a function of the density of the image area then producing the scan signal, the image signal presentation is always scaled to the calibration pulse presentation and the later can be employed as a scale for measurements of density.

Furthermore, since the system automatically adjusts signal amplification to compensate for variations in scanning slot width, the width of the scanning slot can be adjusted during scanning without affecting the height of the presented density profile, and an operator can quickly make slot width adjustments as necessary to find the slot width that best suits the characteristics of the particular image area being scanned, without having to make other compensating adjustments.

From the foregoing description taken with the accompanying drawing it will be apparent that this invention provides means for producing a calibration pulse which can be directly compared with density signals that correspond to variations in density across a scanned small area of a photographic plate to permit direct evaluation of density at any point across the scan, and, further, provides means for utilizing such calibration pulses to compensate for alterations in width of the scanning slot as well as for such uncontrollable variables as alteration in the output of the light source used for scanning.

Those skilled in the art will appreciate that the invention can be embodied in forms other than as herein disclosed for purposes of illustration.

The invention is defined by the following claims:

1. In apparatus for producing output signals that vary in magnitude in correspondence with variations in density detected during scanning across a small area of a photographic plate, and which apparatus comprises a constant intensity light source cooperating with optical means to project a light beam through a small area of a photographic plate and along a defined path, a photo-responsive detector in said path, means between the photographic plate and the detector defining a scanning plot in said path through which only a limited portion of said beam can pass to the detector, and oscillatory means for effecting relative scanning motion between said slot defining means and the beam in directions transverse to the length of said slot:
   A. means defining a second path for light from said source, said second path being in bypassing relation to the photographic plate but having a portion which substantially coincides with a portion of the first mentioned path that extends through said slot and to the detector;
   B. chopper means synchronized with said oscillatory means for
      1 regularly interrupting said light beam for uniform periods so that said output signals are produced only during the intervals when the beam is uninterrupted and
      2. for admitting light from said source to said second path during said periods to cause the detector to have a pulse output during each such period;
   c. amplifier means connected with said detector to receive the outputs therefrom as inputs to be amplified; and
   D. means for controlling the amplification factor of said amplifier means in accordance with the magnitude of only the pulse signal portions of its output and in a manner to maintain that magnitude substantially constant, so that the magnitude of the amplified output signals differs from that of the amplified pulse signals only by a factor corresponding to density of the plate area being scanned and said magnitudes can be directly compared for evaluation of density.

2. The apparatus of claim 1, further characterized by:

E. said means for controlling the amplification factor of the amplifier means being connected in feedback relation therewith and comprising
      1. comparator means having
         a. one input to which a constant magnitude reference signal is applied,
         b. another input to which the output of the amplifier means can be applied, and
         c. output means connected with the amplifier means and by which a substantially continuous error signal can be fed to the amplifier means that corresponds in magnitude and sign to the difference between said constant magnitude reference signal and a signal transiently applied to said one input, and
      2. switching means by which the output of the amplifier means can be intermittently applied to said other input of the comparator means; and
   F. means synchronized with said chopper means for closing said switching means only during times when light from said source is admitted to said second path so that said comparator means responds only to the pulse signal output of the amplifier means.

3. The apparatus of claim 2, wherein said means connected in feedback relation to the amplifier means further comprises analogue storage means adapted to store for a predetermined interval a quantity which corresponds in magnitude to a transient signal fed to said other input of the comparator means.

4. The method of producing electrical signals having a magnitude which varies with variations in density across a small area of a photographic plate being scanned, and which method comprises directing a beam of light from a constant density light source through an area of a photographic plate to be scanned and thence through a narrow scanning slot and onto a photoelectric detector, and producing relative scanning motion between the beam and the scanning slot, said method being characterized by the further steps of:

A. directing another beam of light from the same light source around the photographic plate and through the scanning slot to the photoelectric detector;
   B. alternately interrupting said beams, such interruption being so synchronized to the scanning motion that
      1. the first mentioned beam is permitted to pass uninterruptedly to the detector during substantially a full scanning motion and
      2. said other beam is permitted to pass to the detector only during interruptions of the first mentioned beam so that each time said other beam falls upon the detector it causes the detector to produce a calibration pulse signal having a magnitude that is independent of film density but otherwise depends upon the same factors as affect the magnitude of the detector output that is due to the first mentioned beam;
   C. amplifying all of the output of the photoelectric detector; and
   D. by reference to the amplified calibration pulse signals so controlling the gain of such amplification as to maintain the magnitude of the amplified calibration pulse signals at a constant predetermined value.

5. The method of claim 4, further characterized by:

E. producing a switching control pulse signal during each interval that said other beam is permitted to fall upon the detector;
F. utilizing said switching control pulse signals to isolate the amplified calibration pulse signals from the total amplified output of the detector;
G. by comparing said amplified calibration pulse signals with a substantially constant magnitude reference signal producing an error signal; and
H. by the feedback of said error signal controlling the gain of amplification to maintain said amplified calibration pulse signals at said constant predetermined value.

* * * * *